United States Patent [19]

Carlson et al.

[11] 4,226,658
[45] Oct. 7, 1980

[54] METHOD OF MAKING RETROREFLECTIVE LAMINATE

[75] Inventors: Russell L. Carlson, Tallmadge; David L. Eastin, Hudson; Ralph H. Loehning, Stow; William E. Stalker, Cuyahoga Falls, all of Ohio

[73] Assignee: Morgan Adhesives Company, Stow, Ohio

[21] Appl. No.: 2,984

[22] Filed: Jan. 12, 1979

[51] Int. Cl.² .................. B32B 31/08; G02B 5/128
[52] U.S. Cl. .................................. 156/247; 156/276; 156/324
[58] Field of Search ............ 156/249, 247, 246, 276, 156/238, 289, 324; 428/325, 40; 350/105; 427/204, 163

[56] References Cited

U.S. PATENT DOCUMENTS

| | | | |
|---|---|---|---|
| 3,172,942 | 3/1965 | Berg | 350/105 |
| 3,936,567 | 2/1976 | Vesely | 428/325 |
| 4,023,889 | 5/1977 | Eagon et al. | 156/322 |

*Primary Examiner*—Michael W. Ball
*Attorney, Agent, or Firm*—Vern L. Oldham

[57] ABSTRACT

The laminate includes a partially cured flexible acrylic face sheet having a primer layer on one surface thereof bonded to a binder layer having a layer of reflective glass beads embedded therein and protruding therefrom. The laminate being completed with the spacer layer bonded to a bead embedded binder layer. A reflective mirror-like thin metal coating is provided on the outer surface thereof. The improvement resides in using a supported spacer layer so that no stretching of the spacer layer occurs during lamination, thus resulting in lessening of visual defects such as wrinkles and the like and crossbanding in the reflectant characteristics. The process further eliminates the use of a seal coat as well as combining bead coating and lamination into one step rather than two as in the prior art.

4 Claims, 4 Drawing Figures

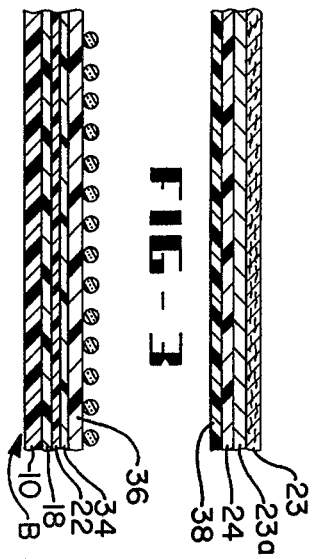
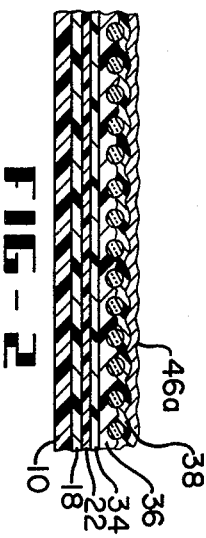
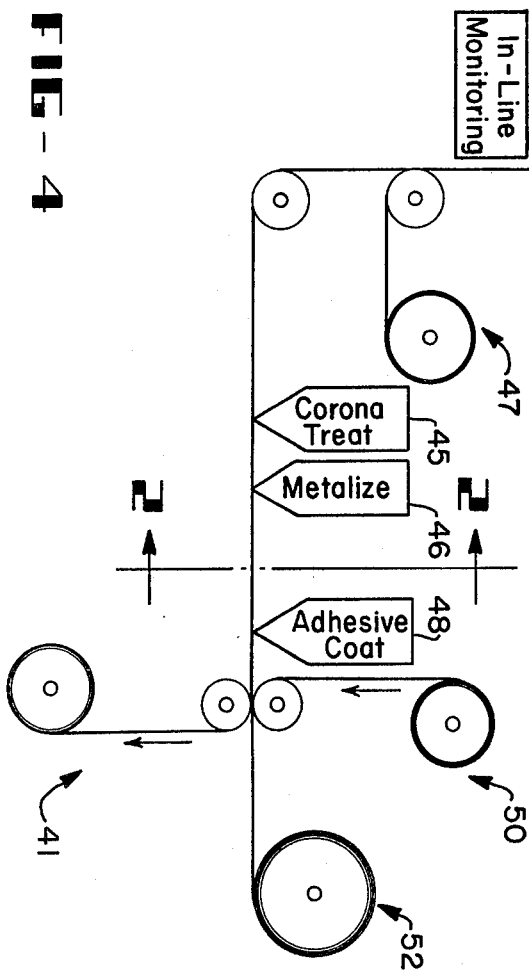
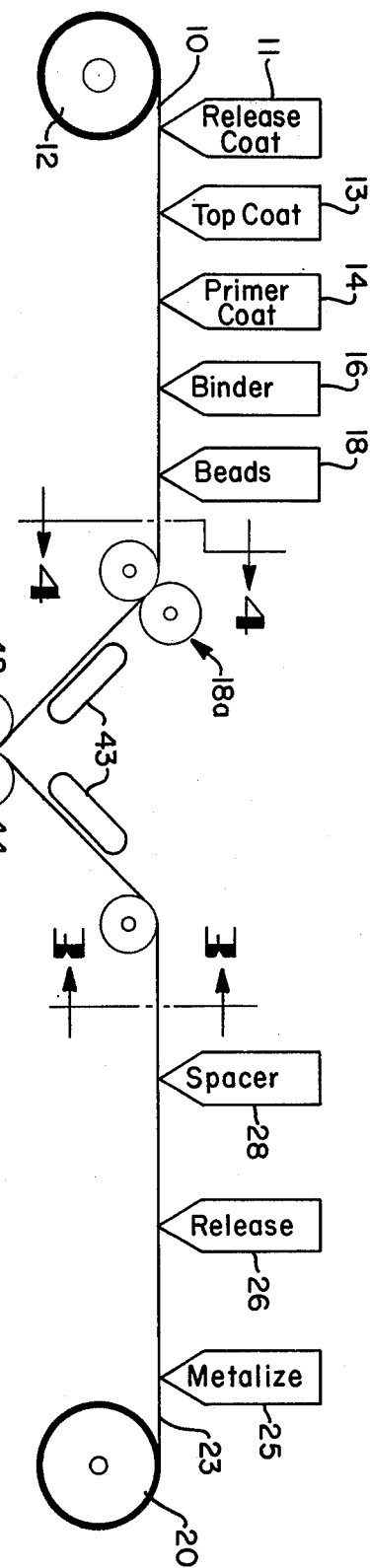

METHOD OF MAKING RETROREFLECTIVE LAMINATE

BACKGROUND OF THE INVENTION

This invention is an improvement over U.S. Pat. No. 4,023,889, also assigned to Morgan Adhesives Company, and particularly is designed to improve upon the process thereof in achieving a better support for the spacer layer so that no stretching or deformation of the spacer layer occurs during the lamination procedure. In addition, the process eliminates the use of a seal coat and combines bead coating and lamination into one step rather than in two.

There has been a great amount of patent and commercial activity on various procedures to make laminates and the compositions thereof in the retroreflective laminate field. Typical prior art patents include U.S. Pat. Nos. 2,432,928; 2,440,584; 2,543,800; 2,397,702 and 2,354,049 on various types of retroreflective laminates, including a layer of glass beads therein and their methods of production as have been developed heretofore. In addition, of course, the prior art cited in the above-identified application would be pertinent to this process.

It is the general object of the present invention to provide a retroreflective laminate having uniform physical properties therethrough, which laminate has excellent resistance to weathering and has good bonding between all layers in the laminate, and to provide a method for producing an improved retroreflective laminate in which the glass beads are securely positioned.

Another object of the invention is to provide a laminate which utilizes a supported spacer layer so that no stretching of the spacer layer occurs during its laminated application. The characteristics of the support are to utilize a paper film carrier which has a compressibility uniformity over its entire surface which is achieved by a paper carrier having relatively more and shorter fibers, providing a higher bulk density to the carrier film.

A further object of the invention is to eliminate the seal coating taught in the above-identified U.S. Pat. No. 4,023,889, as well as to provide bead coating and lamination in a single step rather than in two steps as taught by the previous invention.

The aforesaid and other objects of the invention which will become apparent as the detailed description proceeds are achieved by providing a method for forming a retroreflective laminate comprising a top coat layer, a binder layer, a spacer layer, optical beads in the binder layer, and a metal film adhered to the spacer layer which is characterized by (a) forming the spacer layer on a paper carrier with release, said carrier having a compressibility uniformly over its entire surface and minimum stretch and deformation characteristics, (b) laminating the spacer layer together with the paper carrier to the binder layer with estranged beads, (c) removing the paper carrier, and (d) applying a metal film to the spacer layer.

For a better understanding of the invention, reference should be made to the accompanying drawing wherein:

FIG. 1 is a diagrammatic view of apparatus for and method of lamination to form the end laminate of the invention;

FIG. 2 is a fragmentary enlarged vertical section taken through lines 2—2 of the laminate shown in FIG. 1;

FIG. 3 is a fragmentary enlarged vertical section taken through lines 3—3 of the laminate shown in FIG. 1; and FIG. 4 is a fragmentary enlarged vertical section taken through lines 4—4 of the laminate shown in FIG. 1.

When referring to corresponding members shown in the drawings and referred to in the specification, corresponding numerals are used to facilitate comparison therebetween.

SUBJECT MATTER OF THE INVENTION

Regarding the details shown in the drawing, a carrier film 10 is suitably drawn from a carrier roll 12 and passed through a release coat station 11, a top coating station 13, and a primer station 14 for application of a primer coating thereto. The laminate formed by these applications onto the film 10 comprises, as seen in FIG. 4, the release layer 18, top coat 22, and primer layer 34.

The carrier film 10 may be a polyester casting sheet, such as one made from Mylar, a polyester manufactured by DuPont, but it also may be a paper carrier or a polyolefin film.

The invention also contemplates the use of a top coat or face layer 22 which is made from selected cross-linked acrylic polymers and is deposited from station 13 to lie between the carrier film 10 and the primer layer 14. A further description with respect to the top coat, the techniques for applying it, and the suitable materials associated therewith is taught beginning at line 52 in column 3 and extending over to line 45 in column 4 of U.S. Pat. No. 4,023,889.

The primer coat is composed of a silane or nitrocellulose dissolved in a conventional solvent. It is preferably applied by a gravure cylindrical roll such as is well known to those skilled in the art. Such coating must then be dried at about 200° F. to about 230° F. for about one-half minute to form a primer layer 34 as seen in FIG. 4. The temperature of the oven in which drying takes place is suitably controlled for such action. Then, a binder coat or layer 36 as seen in FIG. 4 is applied to the dried primer coat 34 as from a binder station 16 and is likewise dried at about 100° F. to about 250° F. for from about one to five minutes to provide the binder layer of from about one-half to three mils thickness.

This binder composition preferably is a polyvinyl butyral such as Butvar B-98 from Monsanto and it is used either unmodified or modified with various plasticizers such as Flexol 3-GH, or epoxy resins, or alpha-pinene, or phenolic resins, or rosin derivatives. Butvar B-98 comprises about 18–22 percent OH- expressed as polyvinyl alcohol, 0–2.5 percent acetate expressed as polyvinyl acetate, and 88 percent butyral expressed as polyvinyl butyral. It has an average molecular weight of 30,000–34,000 and apparent modulus of elasticity of $3.1-3.2 \times 10^5$ psi. The binder material and layer is designed to be flexible and accept glass beads propelled against the binder film layer when hot and to permit the beads to penetrate through the film when external pressure is applied to the beads. Modifiers, when used, are used to change the modulus of the polyvinyl butyral resin which remains flexible and uncured in its processing in the present invention. A typical film casting composition used comprised: polyvinyl butyral—20 parts; solvent ethyl alcohol—80 parts. Or, the solvent system may comprise about 40 parts ethyl alcohol, 20 parts ethyl acetate, 20 parts MEK, 10 parts cellosolve, and 10 parts toluene.

The binder film material, polyvinyl butyral (such as Butvar B-98 or XYHL from Union Carbide), may be modified with various plasticizers (such as Epon 828 and Epon 1001 from Shell Chemical), or alpha-pinene (such as Newport V-40), or phenolic resins (such as Rexinox P-97 from Monsanto or Ambersol St-137 from Rohm & Haas), or rosin derivatives (like Staybelite Ester No. 10 or Hercolyn D from Hercules).

The flow behavior of this binder film and/or of the layer of material forming the film at elevated temperatures and pressure as described herein determine the conformance of the film to the surface of the impressed glass beads. This conformance is a critical factor in determining the physical and optical characteristics of the retroreflective film construction. In the final construction to obtain resistance to delamination, it is necessary to have a strong bond between the surface of the implanted beads and the binder film. In addition, the binder film must have physical characteristics which provide a proper stress gradient from the high modulus bead composition to the low modulus thermoplastic material surrounding the beads. Also, the binder film must have the resistance to deformation and impact under all atmospheric conditions.

The primer layer 34 serves to increase adhesion and reduce the long term possibility of diffusion of reactive chemicals from the top coat into the binder layer 36. The carrier film 10 and release layer 18 are stripped away at a stripping station 41 later in the process.

As a separate operation, but set forth to operate as a total in-line process, a reflective spacer layer of film is formed by starting with a spacer carrier paper stock indicated on roll 20 as the paper spacer carrier 23 which has a release layer 24 formed thereon from an appropriate release application 26. Carrier 23 may be metalized as at station 25 before release coat 26 for purpose of being able to better monitor quality of product at lamination station 40. An inline monitoring station 43 could be used, if the metalized carrier 23 were used. The metalized layer 23a is shown in FIG. 3. Monitoring at station 43 may be a personal visual observation, or may be by electronic detection with lights, etc., but all in a manner understood by those skilled in the art. The techniques of forming the release layer, normally a silicone, is standard and well understood by one skilled in the art. The release-coated paper laminate 23 then is passed to have the spacer cast thereon at station 28 to provide the spacer layer 38. The spacer layer is preferably made from a polyvinyl butyral of the same ranges of compositions as provided for the binder layer 36. The solution is cast onto the spacer carrier 23 by any type of suitable coating apparatus as indicated from station 28, and is dried at about 100° F. to about 250° F. for about one to five minutes to provide a layer or film 38 with a thickness of from about 0.3 to 2 mils. The thickness of the spacer film is varied depending upon the size and refractive index of the glass beads to be used and the physical properties of the film.

The beads are pressed into the binder layer 36 by a pair of bead set rolls 18a which are preferably rubber covered with a durometer of between 100 to 180 and heated to between 210° F. and 230° F. The improvement in the instant invention over U.S. Pat. No. 4,023,889 then resides in carrying the spacer film 38 on the spacer carrier 23 into a lamination station 40 where the bead-coated binder laminate is adhered to the spacer laminate by a suitable pressure lamination through mating pairs of rolls 42 and 44. It is understood, of course, that the method of applying glass beads to the laminate at the bead coating station 18 is similar to that taught in U.S. Pat. No. 4,023,889 and particularly the description in column 6 beginning from line 38 through column 7 line 15. The bead application may be by gravity feed, as also understood by those skilled in the art. Preferably, the beaded laminate as illustrated in FIG. 4 is preheated slightly so that the lamination between roll pairs 42 and 44 achieve a good laminated relationship from the spacer 38 to the binders 36 as achieved by appropriate pressure between the roll pairs 42 and 44. Preferably the roll pairs 42 and 44 will each consist of a heated steel roll and a rubber surfaced roll with the heated steel roll being maintained at a temperature of about 200° F. to about 230° F. and the rubber surfaced roll having a durometer of from about 50 to about 100 shore Scale A. Additional heat is provided by a pair of radiant heaters 43 which are designed to maintain a minimum of 200° F. surface temperature on both webs to be laminated together.

Because there is a direct lamination occurring between the newly formed laminates of FIG. 3 and FIG. 4, there is no need for the application of a sealer coat to the beaded surface of the laminate of FIG. 4 as taught in U.S. Pat. No. 4,023,889, and this, of course, reduces the overall cost of the construction and is believed to actually result in an improvement in the optical characteristics of the end product.

It is an important aspect of the invention that the spacer carrier 23 be of the proper type of paper web so that no stretching of the cast spacer layer 38 occurs before or during lamination at station 40. We have determined that a (coated one side-60) pound litho having excellent paper formation with very uniform paper fibers and having a compressibility uniformly over its entire surface achieves the desired objects to permit stretching or deformation of the spacer layer prior to or during lamination, thus eliminating the problems of visual defects, spacer wrinkles, crossbanding, etc. The paper should also be clay-coated so as to allow it to accept a silicone release at station 26. We have found that 60 pound clay-coated litho from Westvaco or Newton Falls Paper Company has the type of uniform characteristics specified above. These papers really contain more but shorter fibers than prior typical release sheets, and, hence, have a higher bulk density with the excellent uniform compressibility characteristics desired.

This paper litho 23, metalized layer 23a (if used) and release layer 24 are then stripped at a strip station 47 in a conventional manner so that the spacer layer 38 is exposed. Corona treatment at station 45 takes place on the spacer layer, followed by metalization at station 46, followed by adhesive coating at station 48 and release paper application at station 50 to end up with a finished product at station 52. As seen in FIG. 2, the metal film is indicated by numeral 46a. The steps of corona treatment and metalization at stations 45 and 46 are also described in U.S. Pat. No. 4,023,889 and are conventional processes associated with this type of retroreflective laminate.

Hence, it should be understood that the improvement in the invention resides in utilizing the spacer carrier paper film of particular characteristic in the in-line arrangement for direct lamination at station 40 with the basic reflective carrier laminate of FIG. 4. This eliminates distortions in the spacer layer 38 and eliminates the necessity for a seal coat. It also provides bead coating and lamination in a one-step arrangement, rather than two, as is the technique of U.S. Pat. No. 4,023,889.

While in accordance with the patent statutes the best mode of the invention has been illustrated and described, it is to be understood that the invention is not limited thereto or thereby, but that other modifications or changes to achieve the same improved results are contemplated and that the scope of the invention is defined in the appended claims.

What is claimed is:

1. A method for forming a retroreflective laminate comprising a top coat layer, a binder layer, spaced optical beads in and protruding from the binder layer, a spacer layer, and a metal film adhered to one face of the spacer layer which is characterized by
   (a) forming the spacer layer on a fibrous paper carrier with a release layer thereon, said carrier having uniform compressibility over its entire surface and having more but shorter fibers than average papers, said carrier being clay coated on one face and said release layer being in contact with said one face,
   (b) laminating the spacer layer together with the paper carrier to the binder layer with the protruding beads engaging said spacer layer, the fibrous paper carrir supporting the spacer layer to prevent stretching thereof during laminating,
   (c) removing the paper carrier, and
   (d) applying a metal film to the spacer layer.

2. A method for forming a retroreflective laminate as in claim 1 where said paper carrier has a relatively high bulk density.

3. A method for forming a retroreflective laminate as in claim 1 where said spacer layer and said bead binder layer are newly and continuously formed, heating said spacer and binder layers, and retaining said beads in the laminate by applying said spacer layer to the bead-binder layer.

4. A method for forming a retroreflective laminate comprising a top coat layer, a binder layer, spaced optical beads in and protruding from the binder layer, a spacer layer, and a metal film adhered to one face of the spacer layer which is characterized by
   (a) forming the spacer layer on a fibrous litho-paper carrier with a release layer thereon, said carrier having uniform compressibility over its entire surface and having more but shorter fibers than average papers, said carrier being clay coated on one face and said release layer being in contact with said one face,
   (b) heating the spacer layer,
   (c) laminating the heated spacer layer together with the paper carrier to the binder layer while the paper carrier reenforces the heated spacer layer to prevent distortion thereof, the protruding beads directly engaging said spacer layer in such laminating action,
   (d) removing the paper carrier, and
   (e) applying a metal film to the spacer layer.

* * * * *